June 26, 1934. D. K. BLAKE Re. 19,220

CONTROL SYSTEM

Original Filed July 26, 1927 3 Sheets-Sheet 1

Inventor:
David K. Blake,
by Alexander S. Lane
His Attorney.

June 26, 1934. D. K. BLAKE Re. 19,220

CONTROL SYSTEM

Original Filed July 26, 1927 3 Sheets-Sheet 2

Inventor:
David K. Blake,
by Alexander S. Lane
His Attorney.

June 26, 1934. D. K. BLAKE Re. 19,220

CONTROL SYSTEM

Original Filed July 26, 1927 3 Sheets-Sheet 3

Inventor:
David K. Blake,
by Alexander S. Lane
His Attorney.

Reissued June 26, 1934

Re. 19,220

UNITED STATES PATENT OFFICE 19,220

CONTROL SYSTEM

David K. Blake, Niskayuna, N. Y., assignor to General Electric Company, a corporation of New York Original No. 1,785,611, dated December 16, 1930, Serial No. 208,647, July 26, 1927. Renewed May 2, 1930. Application for reissue July 20, 1932, Serial No. 623,679

7 Claims. (Cl. 171—97)

My invention relates to improved control systems for controlling the operation of a circuit breaker in response to the operation of another circuit breaker located at a distance therefrom, and particularly to control systems for alternating current distribution networks.

Where low voltage alternating current networks are used it is the practice to supply energy to the network at different points by means of step-down transformers, the primaries of which are connected by high voltage feeders to a main generating station or other suitable sources of supply. In such network systems it is desirable to be able to disconnect some of the transformers from both the source and the network under light load conditions and to reconnect them to the source and network under heavy load conditions.

One object of my invention is to provide an improved arrangement for effecting the disconnection of the secondary of a transformer from the network whenever the primary is disconnected from its supply source and for effecting the connection of the transformer secondary to the network whenever the primary is connected to the source, and to provide for disconnection of the transformer in the event of a fault on the feeder, the transformer or the network.

In accordance with my invention I provide a pilot wire circuit containing an electroresponsive device which is arranged to effect the opening and closing of the circuit breaker between the transformer secondary and the network and contacts in said pilot wire circuit which are arranged to be actuated in response to the opening and closing of the circuit breaker between the transformer primary and the supply source so that the energization of the electroresponsive device is varied in accordance with the position of the circuit breaker in the transformer primary to effect a corresponding operation of the circuit breaker in the transformer secondary.

My invention will be better understood from the following description taken in connection with the accompanying drawings and its scope will be pointed out in the appended claims.

Figure 1:
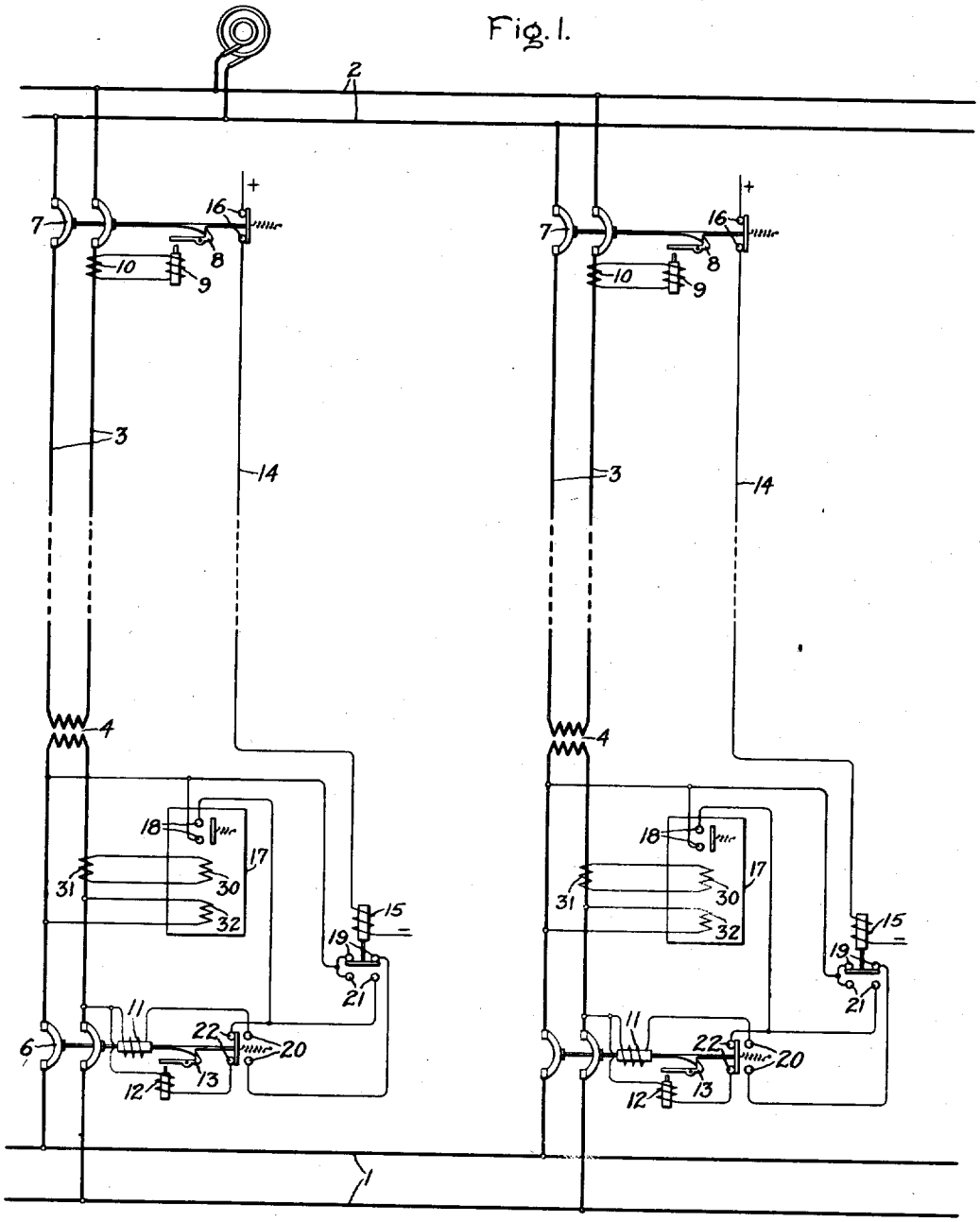
Figure 2:
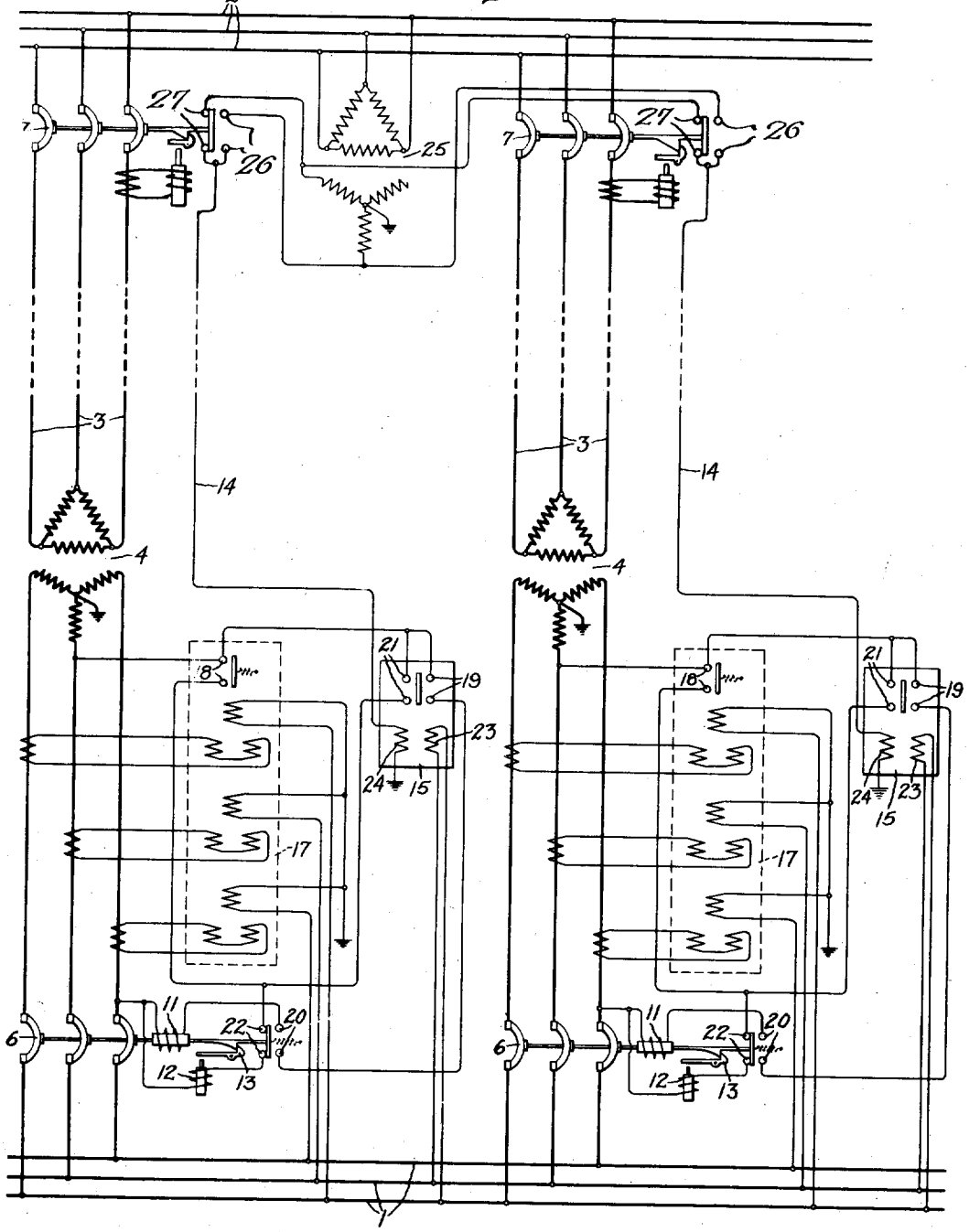
Figure 3:
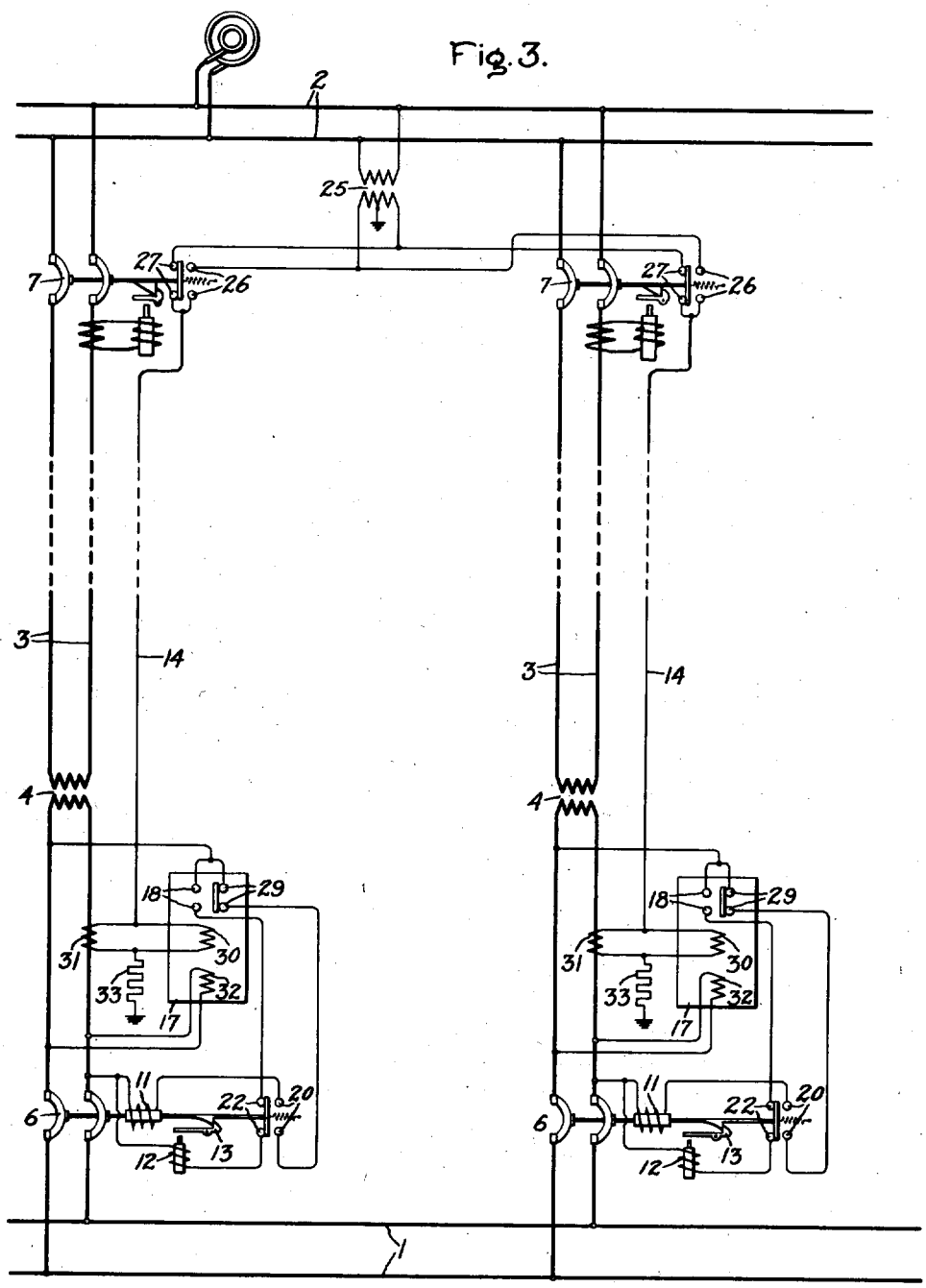

In the accompanying drawings, Fig. 1 is a diagram of a system embodying my invention and Figs. 2 and 3 are diagrams of systems embodying modifications of my invention.

Referring to Fig. 1, 1 is a network which is arranged to be supplied with energy from a suitable supply source 2 by means of a plurality of feeders 3, two of which are shown in the drawings. In order to simplify the disclosure single phase circuits are shown but it is obvious that my invention is equally applicable to polyphase circuits.

Each feeder 3 comprises a step-down transformer 4 the low voltage secondary of which is arranged to be connected to the network 1 by means of suitable switching means 6 and the high voltage primary of which is arranged to be connected to the supply source 2 by means of suitable switching means 7. The transformers 4 and the secondary switches 6 are usually located near the network 1 whereas the primary switches 7 are usually in the main station or substation containing the supply source 2.

The switching means 7, which may be of any suitable type, examples of which are well known in the art, are usually arranged so that they may be opened and closed at the will of an operator and are also preferably arranged so that they are opened in response to overload conditions on the respective feeders. As shown, each switch 7 is an overload circuit breaker of the well known latched-in type which is adapted to be closed manually and which is adapted to be opened by releasing a latch 8 either manually or automatically by means of an overload coil 9 which is connected in series relation with the respective feeder 3 by means of a current transformer 10.

The switching means 6 may be of any suitable type, examples of which are well known in the art. As shown in the drawings each switching means 6 is a latched-in circuit breaker and comprises a closing coil 11 which when energized closes the circuit breaker and a trip coil 12 which when energized releases a latch 13 that holds the circuit breaker in its closed position.

In order to effect the corresponding opening and closing of the circuit breaker 6 in the secondary circuit of a transformer when the circuit breaker 7 in the primary circuit is opened and closed, I provide a pilot wire circuit 14 for each feeder and connect therein a suitable electroresponsive device, such as a relay 15, which is arranged to control the circuits of the closing coil 11 and the trip coil 12 of the respective circuit breaker. As shown in this figure the relay 15, when energized, effects the connection of the closing coil 11 of the respective circuit breaker 6, when it is open, across the transformer secondary and when deenergized effects the connection of the trip coil 12 of the respective circuit breaker 6, when it is closed, across the transformer secondary. In order to effect the energization of the relay 15 when the respective circuit breaker 7 is closed and its deenergization when the circuit breaker is opened, the circuit breaker 7 is provided with auxiliary contacts 16 which are connected in the pilot wire circuit so that it connects the pilot wire circuit across a suitable source of control current, which may be either alternating or direct current, when the circuit breaker 7 is closed and is disconnected from the source of control current when the circuit breaker 7 is open.

In order to effect the immediate opening of the secondary circuit breaker 6 when a fault occurs on its associated feeder or transformer so that a large reversal of energy occurs through the circuit breaker 6, I provide a suitable reverse power relay 17 which is connected in the transformer secondary circuit. As shown the relay has a current coil 30 which is connected in series relation with the transformer secondary by means of a current transformer 31 and a voltage coil 32 which is connected across the transformer secondary. This relay is arranged to close its normally open contacts 18 when the reverse power exceeds a predetermined amount and thereby connect the trip coil 12 of the associated circuit breaker 6 across the network 1 so as to effect the opening thereof. Therefore, in case of fault on a feeder or transformer the associated secondary circuit breaker 6 is opened independently of the associated primary circuit breaker 7.

Preferably the reverse power relays 17 are set so that they close their respective contacts 18 only in response to relatively large reversal of energy in their respective feeders. Such a high setting of the relays 17 has the advantage that reversals of energy in a feeder which are not sufficient to effect the opening of the overload circuit breaker 7 therein do not effect the opening of the circuit breaker 6 under conditions which would cause the circuit breaker 6 to be reclosed immediately after it is opened. In this manner the operation of the circuit breaker well known in the art as "pumping" is prevented.

The operation of the arrangement shown in Fig. 1 is as follows: Whenever the circuit breaker 7 in any feeder is closed, the closing of its auxiliary contacts 16 connects the associated pilot wire 14 across a suitable source of current so that the relay 15 therein is energized. The relay 15 by closing its contacts 19 connects the closing coil 11 of the associate circuit breaker 6 across the transformer secondary which is energized. This circuit is from one terminal of the transformer secondary through contacts 19 of relay 15, auxiliary contacts 20 on the circuit breaker 6, closing coil 11 to the other terminal of the transformer secondary. As soon as the circuit breaker 6 closes the circuit of the closing coil 11 is opened at the auxiliary contacts 20, but the circuit breaker 6 is held in its closed position by the latch 13.

Whenever a primary circuit breaker 7 is opened either automatically or by hand the opening of its auxiliary contact 16 opens the circuit of its associated relay 15 which becomes deenergized and closes its contacts 21. A circuit is then completed for the trip coil of the circuit breaker 6 to effect its opening if it is not already open. This circuit is from one side of the network through contacts 21 of relay 15, auxiliary contacts 22 on the circuit breaker 6, trip coil 12, to the other side of the network.

In case of a fault in the feeder 2 or its transformer 4, the excessive current in the feeder causes the trip coil 9 connected thereto to be energized sufficiently to effect the opening of the respective circuit breaker 7. Energy also is fed to the fault from the network and this reverse flow of energy causes the relay 17 to close its contacts 18 thereby connecting the trip coil 12 of the respective circuit breaker across the transformer secondary to effect the opening of the circuit breaker 6.

Therefore, it will be obvious that I have provided a simple arrangement for effecting the corresponding opening and closing of the secondary switch 6 whereby the associated primary switch 7 is opened and closed.

In Fig. 2 I have shown a modification of my invention in connection with a polyphase system. The network 1, supply source 2, feeders 3, transformers 4, switches 6 and 7 and reverse power relays 17 are the same as in Fig. 1 except that they are polyphase instead of single phase.

In this figure I have shown a different arrangement for controlling the circuit breakers 6. Instead of using an ordinary current relay 15, I use an alternating current voltage directional relay which may be of any suitable type, examples of which are well known in the art, and arrange the associated circuit breaker 7 so that it impresses upon the pilot wire circuit when the circuit breaker 7 is closed a voltage having a phase which causes the directional relay to move in one direction and impresses upon the pilot circuit when the circuit breaker 7 is open a voltage having a different phase so as to cause the directional relay to move in the opposite direction. This result is obtained in the arrangement shown in the drawings by connecting one winding 23 of the directional relay 15 across one phase of the network 1 and connecting the other winding 24 of the relay 15 in the pilot wire circuit 14 and providing the corresponding circuit breaker 7 with auxiliary switches so that when the circuit breaker 7 is closed a voltage of the proper phase to cause the relay 15 to close its closing contacts 19 is impressed upon the winding 24 and so that when the circuit breaker 7 is open a voltage of the proper phase to cause the relay 15 to close its tripping contacts 20 is impressed upon the winding 24.

As shown in the drawings voltages of the proper phase to operate the relay 15 are obtained by an auxiliary polyphase transformer 25 at the main substation. When a circuit breaker 7 is open, its auxiliary contacts 26 connect the pilot wire circuit 14 across the proper phase of the secondary of the transformer 25 so that windings 23 and 24 cooperate to close the contacts 21 and when the switch is closed its auxiliary contacts 27 connect the pilot wire circuit across the proper phase of the transformer secondary so that the windings 23 and 24 cooperate to close the relay contacts 19. Preferably the relay 15 is biased to a position in which both of its contacts are open but in some cases it may be desirable to have it so that its closing contacts 19 are closed.

The operation of the arrangement shown in Fig. 2 will be obvious from the description given heretofore and therefore it is believed that a detail description thereof is unnecessary.

In Fig. 3 I have shown a modification of the arrangement of Fig. 1 in which the reverse power relays 17 also are used as voltage direction relays to control the opening and closing of the respective secondary circuit breakers 6. In this modification each reverse power relay 17 is provided with closing contacts 29 and the respective pilot wire circuit 14 is connected to one terminal of the current coil 30 of the power directional relay 17 and the other terminal is connected to ground preferably through a suitable impedance 33 such as a resistor so as to limit the current to a predetermined value. Each circuit breaker 7, when closed, is arranged to connect by means of its auxiliary contacts 27 the respective pilot wire circuit 14 to one secondary terminal of a suitable transformer 25, the midpoint of which is grounded and, when open, is arranged to connect the pilot wire circuit of the secondary terminal of the transformer 25. Therefore, the current that flows through a pilot wire circuit 14 when the respective circuit breaker 7 is closed is substantially 180° out of phase with the current that flows through the pilot wire circuit when the respective circuit breaker 7 is open. The constants of each pilot wire circuit 14 are preferably made such that the current therein, when the respective circuit breaker 7 is closed, is substantially in phase with the current flowing in the secondary of the current transformer 31 supplying the current coil 30 of the respective power directional relay when power is flowing to the network at a predetermined power factor so that both currents act accumulatively under these conditions to maintain the closing contacts 29 of the relay 17 closed. When a fault occurs on a feeder so that power flows from the network to the feeder the phases of the currents in the secondary of the respective transformer 31 and pilot wire circuit 14 are substantially different and, if the reverse power exceeds a certain amount, the phase of the resultant current through the winding 30 of the respective relay 17 will bear such a relation to the phase of the current in its potential winding 32 that the relay will open its closing contacts 29 and close its tripping contacts 18. When a circuit breaker 7 is opened either automatically or manually so that its auxiliary contacts 26 are closed, the current in the respective pilot wire circuit 14 is substantially 180° out of phase with the current that flows in the pilot circuit 14 when the circuit breaker 7 is closed. Furthermore the current in the secondary of the respective current transformer 31 is reversed from what it is when power flows from the feeder to the network since with the circuit breaker 7 open the network supplies magnetizing current to the transformer. Therefore, both currents are accumulatively to produce a resultant current in the winding 30 which cooperates with the current in the winding 32 of the respective relay 17 to produce a torque which causes the relay to open its closing contacts 29 and close its tripping contacts 18.

Each relay 17 is preferably designed so that with the respective circuit breaker 6 open and the respective circuit breaker 7 closed sufficient current flows through the respective pilot wire circuit and the relay coil 30 to cause the relay to close its contacts 29 and thereby effect the closing of the circuit breaker 6. In this manner any circuit breaker 6 can be closed when its respective circuit breaker 7 is open.

The operation of the arrangement will be obvious from the above description and therefore a detail description is believed not to be necessary.

While I have in accordance with the patent statutes shown and described my invention as applied to particular systems and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:—

1. In combination, an alternating current supply circuit, a network, and a plurality of feeders connecting said circuit to said network, each feeder including a transformer, switching means for connecting the transformer to the supply circuit, overload responsive means for opening said switching means, other switching means for connecting the transformer to said network, reverse power responsive means for effecting the opening of said other switching means, a pilot wire circuit, electroresponsive means in said pilot wire circuit for controlling the opening and closing of said other switching means, and contacts in said pilot wire circuit arranged to be actuated in response to the opening and closing of the first mentioned switching means in the feeder to effect the operation of the electroresponsive means.

2. In combination, an alternating current source, a network, and a plurality of feeders connecting said source to said network, each feeder including a transformer, switching means for connecting the transformer to the source, other switching means for connecting the transformer to the network comprising a closing coil and a trip coil, a pilot wire circuit, a relay in said pilot wire circuit arranged when in one position to effect the connection of said closing coil across the secondary of the transformer and when in another position to effect the connection of said trip coil across the secondary of the transformer, and auxiliary contacts on said first mentioned switching means arranged to control the energization of said pilot wire circuit in accordance with the position of said first mentioned switching means.

3. In combination, a transformer, two alternating current circuits, switching means for connnecting one winding of said transformer to one of said circuits, other switching means for connecting another winding of said transformer to the other circuit, a pilot wire circuit, a directional relay connected in said pilot wire circuit for controlling the operation of one of said switching means, and means including means controlled by the other switching means for impressing different voltages upon said pilot wire circuit.

4. In combination, an alternating current source, a network, and a plurality of feeders connecting said source to said network, each feeder comprising a transformer switching means for connecting the transformer primary to the source, other switching means for connecting the transformer secondary to the network, a pilot wire circuit associated therewith, an alternating current directional relay having a winding connected to said pilot wire circuit for controlling said other switching means, and means including means controlled by the position of said first mentioned switching means for impressing voltages of different phases on said pilot wire circuit.

5. In combination, a plurality of feeder circuits for energizing a common network load circuit, each feeder circuit including a high-voltage circuit interrupter, a distribution transformer connected between the high-voltage interrupter and the network, a network interrupter connected between the transformer and the network, and network interrupter control means including closing means responsive to the feeder circuit voltage only and opening means responsive to the magnitude and phase position of currents of substantial magnitude only traversing the network interrupter and opening means responsive to the energization of an associated pilot wire.

6. In combination, a plurality of feeder circuits for energizing a common network load circuit, each feeder circuit including a high-voltage interrupter, a transformer connected between said interrupter and the network, a network interrupter connected between the transformer and the network, and network interrupter-control means including closing means responsive to the feeder circuit voltage only and opening means of one type responsive to reverse currents of a relatively large magnitude only traversing said interrupter and to the phase position of said currents and of another type responsive independently to energization of an associated pilot wire.

7. In combination, a plurality of feeder circuits for energizing a common network load circuit, each feeder circuit including a high-voltage circuit interrupter, a distribution transformer connected between the high-voltage interrupter and the network, a network interrupter connected between the transformer and the network, and network interrupter control means including closing means responsive to the feeder circuit voltage only and including opening means having a reverse current tripping means and an independently controlled tripping means in a pilot-wire circuit.

DAVID K. BLAKE.